US007991160B2

(12) United States Patent
Guccione et al.

(10) Patent No.: US 7,991,160 B2
(45) Date of Patent: Aug. 2, 2011

(54) METHOD AND SYSTEM FOR SECURING WIRELESS COMMUNICATIONS

(75) Inventors: Louis J. Guccione, East Chester, NY (US); Inhyok Cha, Yardley, PA (US); Alexander Reznik, Titusville, NJ (US); Chunxuan Ye, King of Prussia, PA (US); Renuka Racha, Kings Park, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 934 days.

(21) Appl. No.: 11/736,830

(22) Filed: Apr. 18, 2007

(65) Prior Publication Data
US 2008/0123851 A1 May 29, 2008

Related U.S. Application Data

(60) Provisional application No. 60/792,934, filed on Apr. 18, 2006, provisional application No. 60/829,940, filed on Oct. 18, 2006.

(51) Int. Cl.
*H04K 1/00* (2006.01)
(52) U.S. Cl. ..................... 380/270
(58) Field of Classification Search .............. 380/270
See application file for complete search history.

(56) References Cited

U.S. PATENT DOCUMENTS

| 5,161,244 A | 11/1992 | Maurer |
| 5,604,806 A | 2/1997 | Hassan et al. |
| 5,745,578 A * | 4/1998 | Hassan et al. ............ 380/44 |
| 5,881,226 A * | 3/1999 | Veneklase ............ 726/16 |
| 6,031,913 A | 2/2000 | Hassan et al. |
| 2002/0071480 A1* | 6/2002 | Marjelund et al. ........ 375/141 |
| 2002/0118778 A1* | 8/2002 | Sipila ............ 375/341 |
| 2003/0236098 A1* | 12/2003 | Hayoun ............ 455/500 |
| 2004/0088558 A1 | 5/2004 | Candelore |
| 2004/0152458 A1* | 8/2004 | Hottinen ............ 455/423 |

(Continued)

FOREIGN PATENT DOCUMENTS

WO 96/22643 7/1996

(Continued)

OTHER PUBLICATIONS

3GPP, *3rd Generation Partnership Project; Technical Specification Group Services and System Aspects; 3G Security; Security Architecture (Release 6)*, 3GPP TS 33.102 V6.3.0, Dec. 2004).

(Continued)

*Primary Examiner* — Jason K Gee
(74) *Attorney, Agent, or Firm* — Woodcock Washburn LLP

(57) ABSTRACT

A wireless transmit/receive unit (WTRU) and a Node B, respectively, perform joint randomness not shared by others (JRNSO) measurement to generate JRNSO bits based on a channel estimate between the WTRU and the Node B. The WTRU and the Node B then perform a reconciliation procedure to generate a common JRNSO bits. The Node B sends the common JRNSO bits to a serving network. The WTRU and the SN secure a session key (such as an integrity key, a cipher key and an anonymity key), using the common JRNSO bits. The JRNSO measurements are performed on an ongoing basis, and the session key is updated using a new set of common JRNSO bits. The JRNSO bits may be expanded by using a pseudorandom number generator (PNG) or a windowing technique. A handover may be intentionally induced to increase the JRNSO bits generation rate.

30 Claims, 6 Drawing Sheets

U.S. PATENT DOCUMENTS

| | | | |
|---|---|---|---|
| 2006/0023653 A1* | 2/2006 | Montalbano | 370/315 |
| 2007/0058808 A1* | 3/2007 | Rudolf et al. | 380/44 |
| 2008/0019517 A1* | 1/2008 | Munguia et al. | 380/210 |
| 2008/0304658 A1* | 12/2008 | Yuda et al. | 380/44 |

FOREIGN PATENT DOCUMENTS

| | | |
|---|---|---|
| WO | 02/054807 | 7/2002 |
| WO | 2006/081122 | 8/2006 |

OTHER PUBLICATIONS

Ahlewede et al., *Common Randomness In Information Theory And Cryptography—Part I: Secret Sharing*, IEEE Transactions On Information Theory, vol. 39, No. 4, pp. 1121-1132, (Jul. 1993).

Csiszár et al., *Common Randomness And Secret Key Generation With A Helper*, IEEE Transactions on Information Theory, vol. 46, No. 2, pp. 344-366, (Mar. 2000).

Csiszár et al., *Secrecy Capacities for Multiple Terminals*, IEEE Transactions on Information Theory, vol. 50, No. 12, pp. 3047-3061, (Dec. 2004).

Maurer et al., *Information-Theoretic Key Agreement: From Weak to Strong Secrecy for Free*, Advances in Cryptology—Eurocript 2000, vol. 1807 Of Lecture Notes in Computer Science, pp. 351-368, (2000).

Maurer et al., *Secret-Key Agreement Over Unauthenticated Public Channels—Part I: Definitions And A Completeness Result*, IEEE Transactions on Information Theory, vol. 49, No. 4, pp. 822-831, (2003).

Maurer et al., *Unconditionally Secure Key Agreement And The Intrinsic Conditional Information*, IEEE Transactions on Information Tehory, IT-45, (Jan. 29, 1999).

Ueli M. Maurer, *Secret Key Agreement By Public Discussion From Common Information*, IEEE Transactions on Information Theory, vol. 39, pp. 733-742, (1993).

Aono et al., "Wireless Secret Key Generation Exploiting Reactance-Domain Scalar Response of Multipath Fading Channels," IEEE Transactions on Antennas and Propagation, vol. 53, No. 11, pp. 3776-3784 (Nov. 2005).

Wilson et al., "Channel Identification: Secret Sharing using Reciprocity in Ultrawideband Channels," (Mar. 18, 2006) available at: http://www.eecs.berkeley.edu/(dtse/channel_id.pdf (last visited Nov. 21, 2008).

* cited by examiner

METHOD AND SYSTEM FOR SECURING WIRELESS COMMUNICATIONS

CROSS REFERENCE TO RELATED APPLICATIONS

This application claims the benefit of U.S. Provisional Application Nos. 60/792,934 filed Apr. 18, 2006 and 60/829,940 filed Oct. 18, 2006, which are incorporated by reference as if fully set forth.

FIELD OF INVENTION

The present invention is related to wireless communication systems. More particularly, the present invention is related to a method and system for securing wireless communications.

BACKGROUND

Universal mobile telecommunication system (UMTS) is one of the dominant standards for wireless communication systems. UMTS uses an authentication and key agreement (AKA) protocol for security. The AKA is based on a global system for mobile communication (GSM) security architecture and represents a significant enhancement to it. Whereas the authentication process in GSM is one way where only the client is authenticated, UMTS requires that both a client and a network are mutually authenticated. A false base station attack, to which the GSM protocol is vulnerable, is largely, if not entirely, neutralized by the UMTS AKA protocol.

The AKA assumes the existence of a long-term shared secret key K between a universal subscriber identity module (USIM), (which is a part of the user equipment (UE)), and a network authentication center (AuC) which resides in the home environment (HE) of the network.

FIG. 1 is a signaling diagram of a conventional authentication procedure which is tightly tied to the UMTS AKA security structure 100. A UE 152 establishes a radio resource control (RRC) connection with a radio network controller (RNC) 156 (step 102). The UE 152 reveals its security capabilities to the RNC 156 during this RRC connection process. The UE 152 then sends a layer L3 message with a user identity (ID) to a visitor location register (VLR) 158 (step 104). A user is identified with the use of the international mobile subscriber identity (IMSI). The L3 message contains a key set identifier (KSI), a number which is associated with the cipher and integrity keys derived during authentication. The KSI is set to a default value when it is sent via the initial L3 message.

Under certain conditions, (e.g., if the user has not been authenticated), the VLR 158 requires an AKA and sends an authentication data request to a home location register (HLR) 160 (step 106). Upon receipt of the authentication data request, the HLR 160 sends a set of authentication vectors (AVs) to the VLR 158 (step 108).

Each AV contains quintet of numbers that includes a random number (RAND), an expected response (XRES) which is used to authenticate the user, a cipher key (CK) for establishing confidentiality, an integrity key (IK), and an authentication token (AUTN). The AUTN comprises a sequence number (SQN) hidden by an anonymity key (AK), an authentication management field (AMF) which specifies certain authentication components, (such as algorithms to be used, key lifetime, etc.), and a message authentication code (MAC) which is functionally dependent on the SQN, the AMF, and the RAND.

The VLR 158 sends the RAND and the AUTN from the first AV to the UE 152 (step 110). The UE 152 then authenticates the network by calculating the expected MAC (XMAC) and determining whether it matches the MAC (step 112). The UE 152 computes a response (RES) and sends the RES to the VLR 158 (step 114). The VLR 158 determines if the RES matches the XRES to authenticate the UE 152 (step 118). An authentication failure occurs if either of these authentication attempts fails at steps 112 and 118. The UE 152 computes the session keys, (i.e., the CK and IK in the AV) (step 116) which provide security for the current session only. The key generation is performed using predefined UMTS algorithms which take RAND as input and apply the shared secret key K.

Once mutual authentication has succeeded at steps 112 and 118, a local authentication procedure starts. This process requires the UE 152 and the VLR 158 to negotiate and determine which UMTS encryption algorithm (UEA) and UMTS integrity algorithm (UIA) to use (step 120) in the current session.

The VLR 158 sends a security mode command to the RNC 156 via a Node B 154, which includes the negotiated UEA and UIA, and the current sessions keys CK and IK (step 122). As secure communication can now begin the RNC 156 then sends the security mode command to the UE 152 with a message authentication code (MAC-I) (step 124). The MAC-I value protects the integrity of the security mode command message; MAC-I is a type of hash computed by UIA on the message's contents using the session key IK.

The UE 152 verifies the integrity of the received message by calculating a MAC-I in a similar mannor, using the UIA with key IK on the security mode command message's contents, and comparing it to the received MAC-I (step 126). If the authentication codes match the UE 152 sends a security mode complete message to the RNC 156 (step 128). This round trip exchange represents the first secure communication. The RNC 156 sends a security mode complete message to the VLR 158 confirming the selected UEA and UIA (step 130). Thus, secure communication (ciphering, deciphering, and integrity protection) begins assuming that all negotiations involving UEAs and UIAs are complete and authentication between the UE 152 and the VLR 158 is satisfied. Although integrity protection is required, communication may be performed without using confidentiality (encryption).

There is a difference between perfect secrecy and computational secrecy on which most modern crypto systems including all public-key systems rely. Modern crypto systems rely on the fact that it may be extremely difficult from a computational resource point of view to guess the crypto key. However, in most of these systems, once the correct guess is produced, it is very easy to verify that this is indeed the correct guess. This ability is what separates computational secrecy from "perfect secrecy." Perfect secrecy means that even if the attacker guesses the key correctly, it will have no ability to determine that it has indeed done so.

Suppose that two parties (A and B) have an access to some sources of randomness, (X and Y), which at predetermined times (indexed by i) generate independent samples $X_i$, $Y_i$. Suppose that A and B wish to generate a perfectly secret key by communicating over a public channel which an eavesdropper (E) has an access to. Moreover, E also has an access to another source of randomness, Z, generating independent samples $Z_i$. The random source Z is presumably dependent on the random sources X and Y, but not as strongly as X and Y are cross-dependent on each other. Thus, A and B share some advantage over E through the stronger inter-dependence of their random sources. It has been shown that A and B can exploit this dependence to generate a perfectly secret random key.

In order to generate a perfectly secret key, A and B start by utilizing their joint randomness to establish a bit-string S' whose inherent entropy from E's point of view is |S| bits with |S|≦|S'|. This is done using some number of public exchanges between A and B. In most cases a single unilateral exchange is sufficient. The exact nature of the exchange depends on the nature of the jointly-random sources (X,Y,Z). A and B then use another set of public exchanges to publicly agree on a function which transforms the sequence S' into a perfectly secret key S.

While correlated random sources are a priori difficult to produce without prior communication, a wireless channel provides such a resource in the form of a channel impulse response (CIR). Specifically, in certain communications systems, two communicating parties, A and B, will measure a very similar CIR when communicating from A to B and from B to A, (e.g., time division duplex (TDD) systems). On the other hand, any party not physically co-located with A and B is likely to observe a CIR that has a very little correlation with that of A and B. This difference can be exploited for generation of perfectly secret keys. The channel is the source of joint randomness not shared with others (JRNSO) and the CIR measurements are the samples taken from the channel.

However, the rate at which such secret keys (bits) can be generated from the JRNSO provided by the wireless channel is typically low. Rates higher than kilobits per second of secret bits are not expected. In practice, the rate is significantly lower. Direct use of such bits for encryption, (e.g., via the one-time pad), results in either very low rates since no more than one bit of data per secret bit can be supported, or susceptible to attacks, (such as a frequency attack).

Therefore, it is desirable to provide a method for generating secret bits at a high rate and enhance encryption systems using a small amount of such shared randomness.

SUMMARY

The present invention is related to a method and system for securing wireless communications. A wireless transmit/receive unit (WTRU) and a Node B, respectively, perform JRNSO measurement to generate JRNSO bits based on a channel estimate between the WTRU and the Node B. The WTRU and the Node B then perform a reconciliation procedure to generate a common JRNSO bits. The Node B sends the common JRNSO bits to the SN. The WTRU and the SN secure a session key, (such as an IK, a CK and an AK), and/or a parameter used for security using the common JRNSO bits. The JRNSO measurements are performed on an on-going basis, and the session key and/or the parameter are updated using a new set of common JRNSO bits. The JRNSO bit sequence may be expanded by using a pseudorandom number generator (PNG); a windowing technique for JRNSO bit management and accumulation may also be used. A handover may be intentionally induced in order to increase the JRNSO bit generation rate.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node B" includes but is not limited to a base station, a site controller, an access point (AP), or any other type of interfacing device capable of operating in a wireless environment.

When referred to hereafter, the terminology "visitor location register (VLR)" is interchangeable with a serving network (SN).

Methods for deriving a secret key using JRNSO measurement has been disclosed in jointly owned copending U.S. patent application Ser. Nos. 11/339,958 filed on Jan. 26, 2006 and 11/318,381 filed on Dec. 23, 2005, and are incorporated by reference as if fully set forth.

The preferred embodiments of the present invention provide forward and backward security for wireless communications. Forward security is necessary for providing continued security in the event that a shared secret key K is compromised. Backward security is necessary to provide an additional protection for the key K against cryptanalysis using only cipher text.

Figure 1:
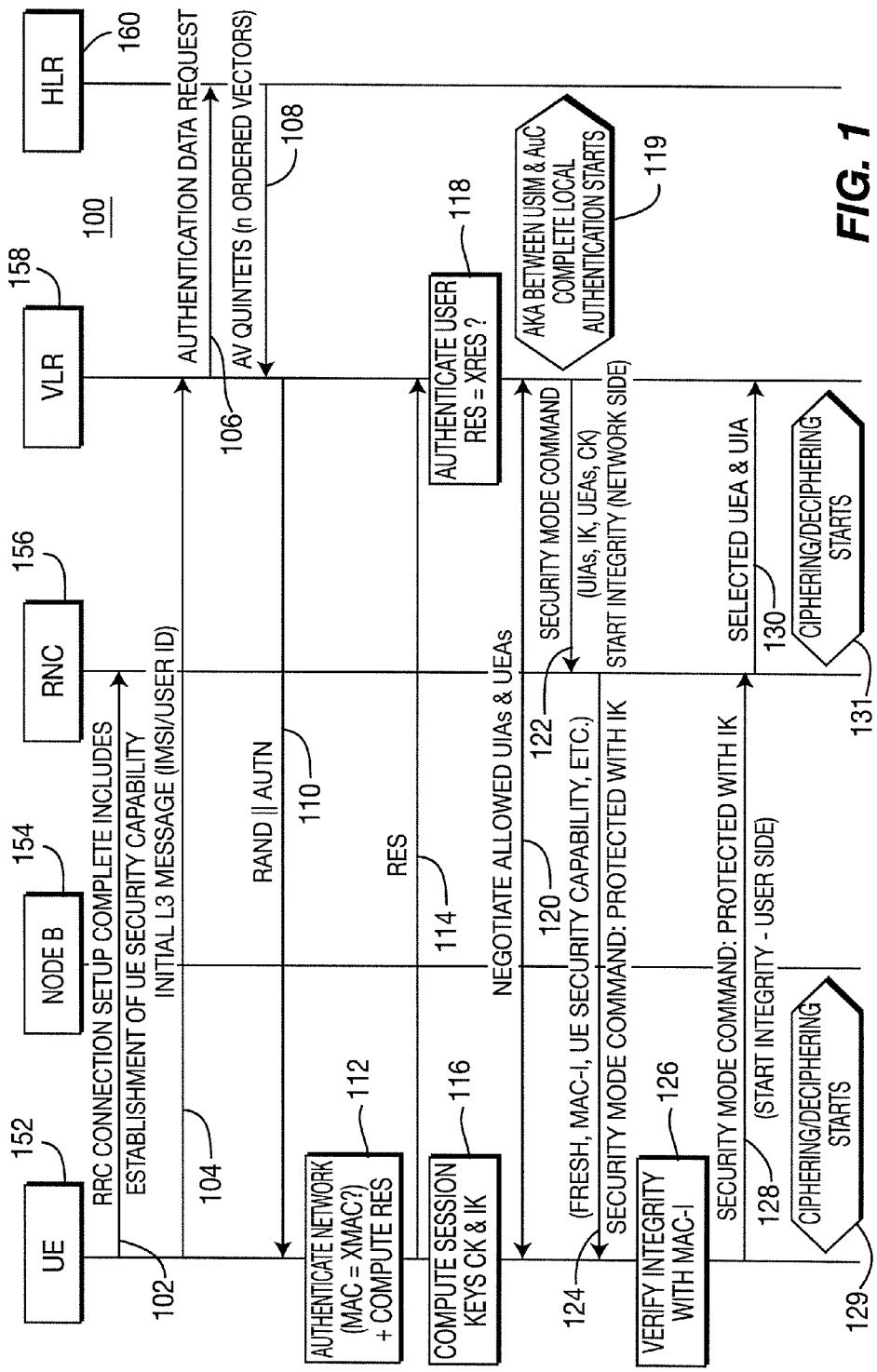
FIG. 1 is a signaling diagram of a conventional authentication procedure.
Figure 2:
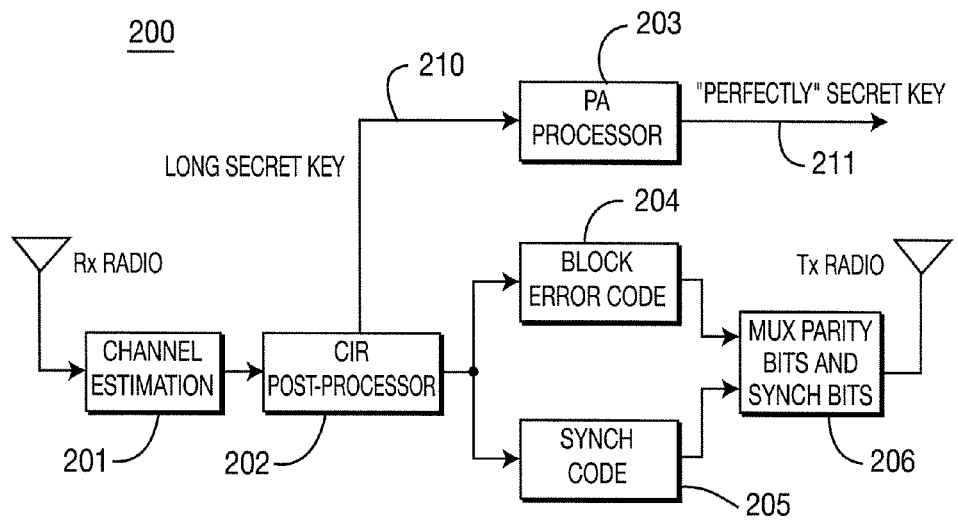
FIG. 2 shows a block diagram of secrecy processing in transceiver A, the lead transceiver.
Figure 3:
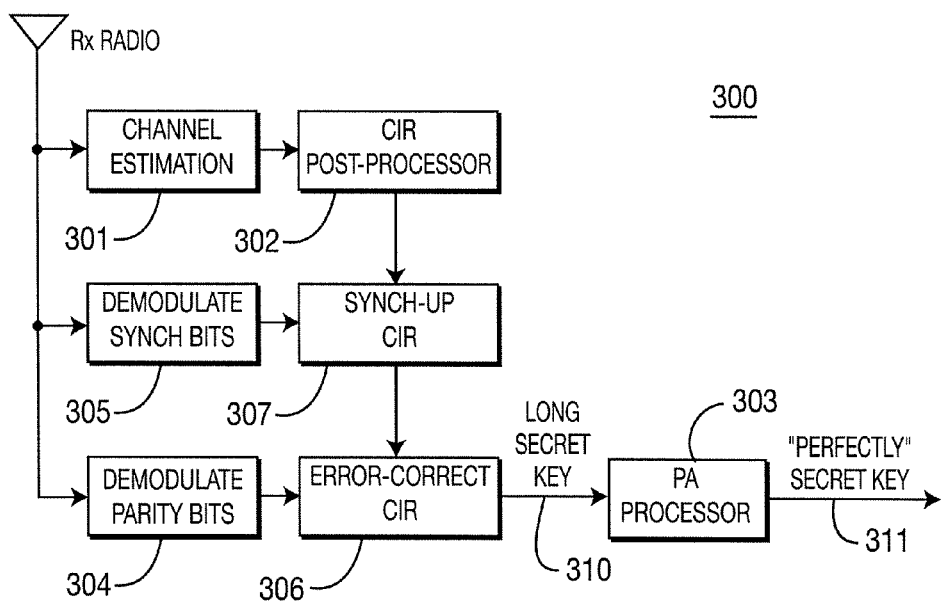
FIG. 3 shows a block diagram of secrecy processing in transceiver B

FIGS. 2 and 3 show block diagrams of transceivers 200 and 300, respectively, which represent two legitimate parties communicating in a point-to-point system. The present invention establishes a perfectly secret key between two transceivers 200 and 300, where transceiver 200 is selected to be the lead transceiver (i.e., transceiver 200 takes the lead in the key establishment process). Note that transceivers 200 and 300 are preferably sub-components of a larger communication system and/or application specific integrated circuits (ASICs). Some or all of the processing elements shown in FIGS. 2 and 3 may be shared for other, non-secrecy-related tasks.

In general terms, transceivers 200 and 300 follow the following initial procedure steps for generating a perfect secret for encrypted communications:

1) Each transceiver mutually transmits to each other either a specially designed signal (e.g., a comb of tones) or a pilot sequence which may also be used for other purposes.
2) The wireless physical channel naturally modifies the sequences somewhat according to the physical environment, creating signal fading and distortions, but due to channel reciprocity these modifications are highly similar. Accordingly, transceivers 200 and 300 utilize the joint randomness inherent in their shared channel to establish secret keys.

3) Each transceiver then transforms its received signal into binary (or some other discrete form) sequences in some fashion.

As shown in FIG. 2, the lead transceiver 200 comprises a channel estimator 201, a channel impulse response (CIR) post processor 202, a privacy amplification (PA) processor 203, a block error code encoder 204, an optional synch code unit 205, a parity bit and synch bit multiplexer (MUX) 206.

At transceiver 200, the channel estimator 201 estimates a channel impulse response (CIR) from a received radio signal from transceiver 300, which is then processed by the CIR post processor 202. The primary task of the CIR post-processor is to convert the estimated CIR into a bit-string hereafter known as the long secret key 210. Transceiver 200 assumes that after completing an information reconciliation process (which will be later described in further detail), transceiver 300 will be in possession of the same bit string, shown as long secret key 210. This long secret key 110, 210 is not perfectly secret for the following reasons: 1) because the CIR samples are potentially correlated (highly correlated for high sampling rates), the bits are not independently distributed; 2) because certain parts of the protocol required public communications, some of the information has been leaked to a potential eavesdropper; 3) because the CIR observed by a potential eavesdropper may be correlated with the CIRs obtained by transceivers 200 and 300. Privacy amplification (PA) processor (203) compensates for these problems.

As part of the information reconciliation process, the block error code encoder 204 derives a block code with parity bits for error correction at transceiver 300. In at least one preferred embodiment, the synch code encoder 205 produces a code used for synchronizing the CIR estimates between transceiver 200 and 300. The parity bits and synch code bits are multiplexed by the MUX 206 for transmission to transceiver 300.

As shown in FIG. 3, transceiver 300 comprises a channel estimator 301, a CIR post-processor 302, a privacy amplification processor 303, a synch bit demodulator 305, a parity bit demodulator 304, and a synch-up CIR unit 307.

At transceiver 300, channel estimator 301 receives the radio signal from transceiver 300 and estimates the CIR. The CIR post processor 302 filters the CIR estimates. These two units operate in an identical manner to the corresponding devices 201 and 202 on transceiver 200. The output of the CIR post-processor 302 is a "random secret key" bit string. Ideally, this string is identical to the long secret key on transceiver 200 based on the channel reciprocity that exists between the two transceivers. However, the actual CIR estimates are not identical due to CIR distortion, channel noise, and different channel estimation starting points; the two strings are in fact somewhat different.

If the actual output of CIR post processor 302 was identical to that of CIR post processor 202, then privacy amplification by PA processor 303 and optional weak-key analysis could be applied to generate a perfectly secret key identical to that at transceiver 200. The nature of PA processor 303 is the same as that of the PA processor 203. However, because the output of CIR post processor 302 is not the same as that of CIR post processor 202, PA processing cannot be applied directly to it. Rather, transceiver 300 uses the parity and synch bits transmitted by transceiver 200 to correct the differences.

In an embodiment where the synch code encoder 205 is implemented, the synch bit decoder 305 and parity bit decoder 304 decode the synch bits and parity bits from the received signal. The CIR synch up unit 307 processes the decoded synch bits and synchronizes the CIR estimate with the CIR estimate of transceiver 200. The parity bit demodulator 304 processes the decoded parity bits and performs error correction on the synchronized CIR estimates. The long secret key 210 has now been recovered as it exists at transceiver 200 and the PA processing can be applied. The long secret key 210 embedded within the received radio signal from transceiver 200 is processed by a PA processor 303 to provide the perfectly secret key 311.

Figure 4A:
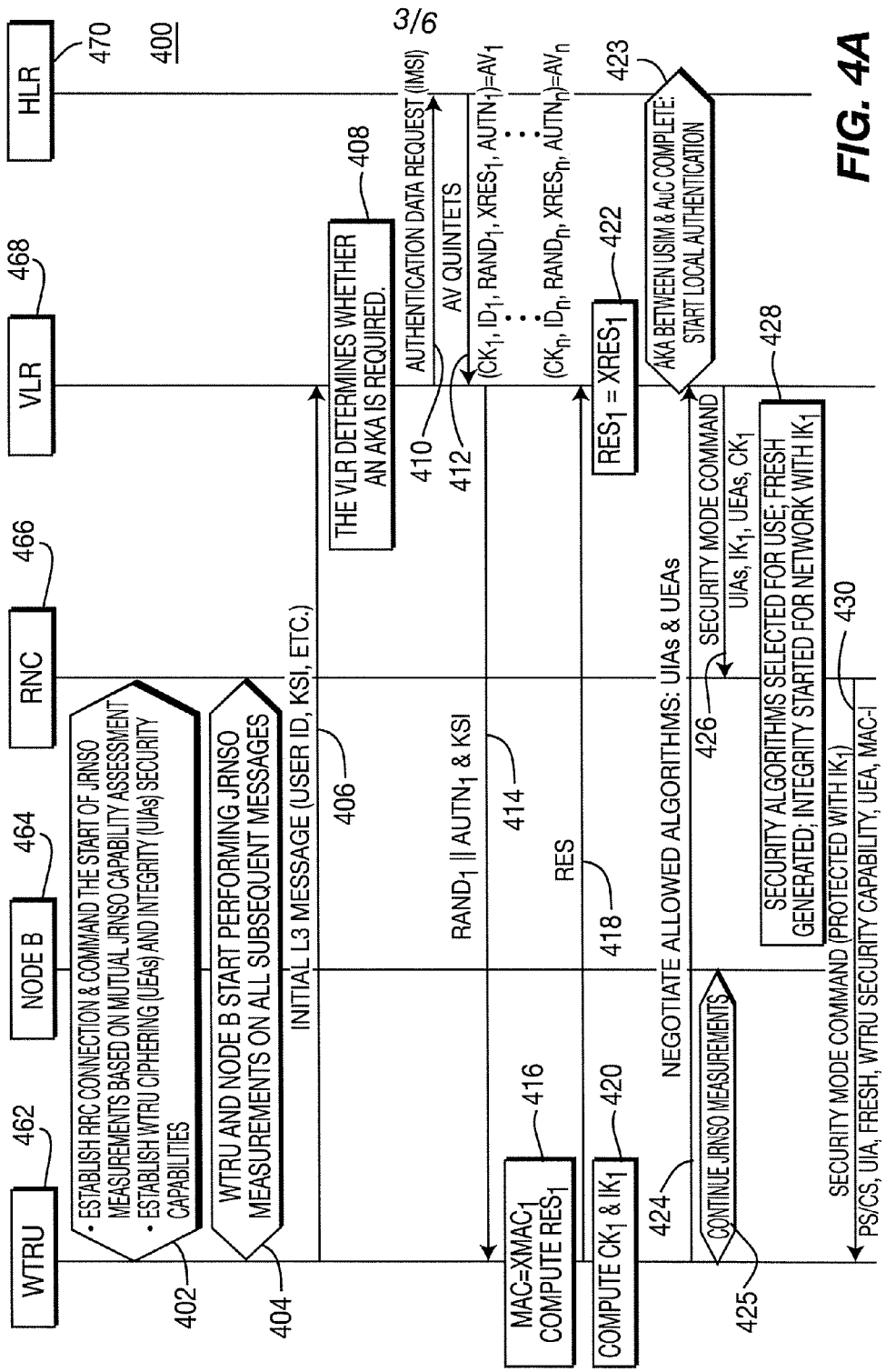
FIGS. 4A and 4B show a signaling diagram of a process for authentication and session key update in accordance with the present invention.
Figure 4B:
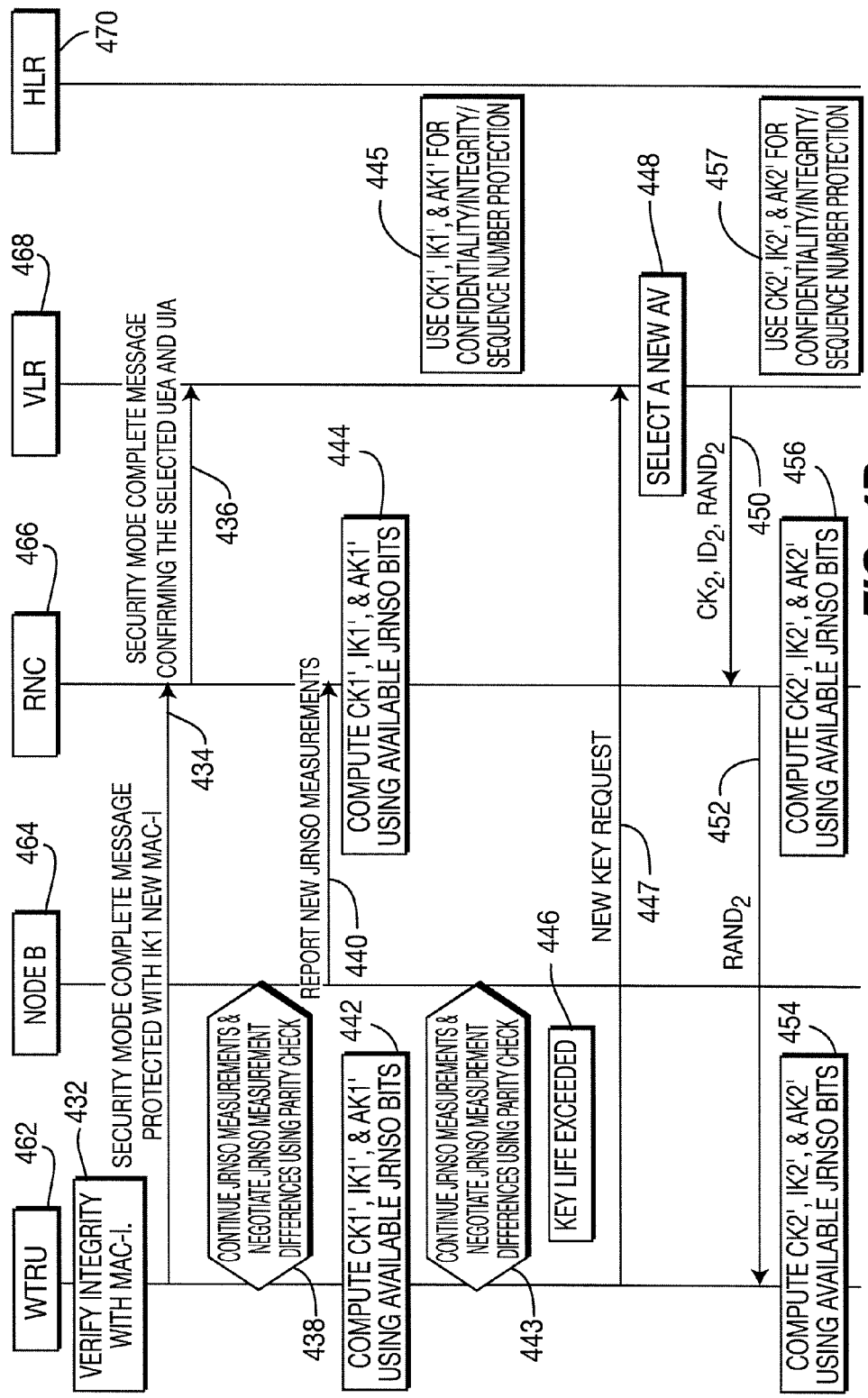

FIGS. 4A and 4B show a signaling diagram of an authentication process 400 in accordance with the present invention. As shown in FIG. 4A, a WTRU 462 establishes an RRC connection with an RNC 466 (step 402). During the RRC connection procedure, the WTRU 462 and a VLR 468 disclose security capabilities including JRNSO capabilities. If both the WTRU 462 and the VLR 468 have JRNSO capabilities, the WTRU 462 and a Node B 464 start performing CIR measurements for JRNSO, (hereafter JRNSO measurements) (step 404) on all subsequent messages communicated between them. The JRNSO measurements result in an accumulation of a sequence of random bits (JRNSO bits) in the WTRU 462 and the Node B 464. The Node B 464 reports the JRNSO bits to the RNC 466 on an ongoing basis. The Node B 464 may report the JRNSO bits by attaching them to a power measurement message. The WTRU 462 and the VLR 468 maintain the same set of JRNSO bits using minimal communication. Parity check bits are communicated in either direction to resolve conflicts between the WTRU 462 and the VLR 468. This resolution is known as the information reconciliation (IR), which will be discussed again later in further detail, in reference to preferred handover embodiments.

The JRNSO measurements use CIR, which is statistically the same for both the Node B 464 and the WTRU 462, to derive shared correlated random bits that each side of the channel uses. A dedicated channel or a common channel may be used for the JRNSO measurements. The JRNSO measurements may be performed in either CELL_FACH or CELL_DCH states.

The WTRU 462 sends an initial L3 message with a user ID, (e.g., IMSI), to a VLR 468 (step 406). The L3 message contains a KSI. The KSI is set to a default value when it's sent in the initial L3 message. The VLR 468 determines whether an AKA is required (step 408); i.e., when a re-authentication or initial authentication is required. If the VLR 468 determines that an AKA is required, the VLR 468 sends an authentication data request to an HLR 470 (step 410). Upon receipt of the authentication data request, the HLR 470 sends a set of AVs, (i.e., AV quintets), to the VLR 468 (step 412).

Each AV quintet contains an RAND, an XRES which is used to authenticate the user, a CK for establishing confidentiality, an IK for integrity, and an AUTN. The AUTN comprises a SQN hidden (i.e., protected) by an AK, an AMF which specifies certain authentication components, (such as algorithms to be used, key lifetime, etc), and an message authentication code (MAC) which depends functionally on the SQN, the AMF, and the RAND. (The AV elements are hereafter subscripted 1 through n; the subscripts indicate order of use.)

The VLR 468 sends $RAND_1$ and $AUTN_1$ from the first AV along with KSI to the WTRU 462 (step 414). The WTRU 462 then authenticates the network by calculating $XMAC_1$ and determining whether $XMAC_1$ matches the $MAC_1$ (step 416). The WTRU 462 computes $RES_1$ and sends $RES_1$ to the VLR 468 (step 418). The WTRU 462 also computes the sessions keys $CK_1$ and $IK_1$ (step 420), which will match the session keys in $AV_1$ if authentication is successful. The VLR 468 determines that $RES_1$ matches $XRES_1$ to authenticate the WTRU 462 (step 422). An authentication failure occurs if either of these authentication attempts fails at steps 414 and 418.

Upon completion of mutual authentication at steps 414 and 418, local authentication starts (step 423). The WTRU 462 and the VLR 468 negotiate ciphering and integrity algorithms, (i.e., UEA and UIA) (step 424). JRNSO measurements are ongoing at the WTRU 462 and Node B 464 (step 425). The VLR 468 sends a security mode command message to the RNC 466 (step 426). The security mode command message includes the negotiated UEAs and UIAs, $CK_1$, $IK_1$. At step 428, a random nonce FRESH is generated and security algorithms are selected. The RNC 466 then sends the security mode command message to the WTRU 462 (step 430). The security mode command message is integrity protected with $IK_1$, which is the session key used by UIA to compute a hash value MAC-I on the message's contents. The security command includes a PS or CS, UIA, FRESH nonce, a WTRU security capability indication, UEA, and the MAC-I.

As shown in FIG. 4B, the process continues as the WTRU 462 verifies the integrity of the received security mode command by similarly calculating a MAC using the UIA (with key $IK_1$) and comparing it to the value MAC-I (step 432). The WTRU 462 then sends a security mode complete message to the RNC 466 (step 434) if the MAC values agree. The security mode complete message is also protected with $IK_1$ and an associated MAC-I. The RNC 466 sends a security mode complete message to the VLR 468 confirming the selected UEA and UIA (step 436) and the start of mutually secure messaging.

JRNSO measurements and information reconciliation procedures using a parity check are performed between the WTRU 462 and the Node B 464 on an ongoing basis (step 438). As new JRNSO bits are generated, the Node B 464 sends the new JRNSO bits to the RNC 466 (step 440). If a sufficient number of JRNSO bits are available, (i.e., the number of new JRNSO bits is equals to, or greater than, the length of the session keys), then the session keys, (CK, IK and AK) are protected (steps 442 and 444). The session keys and/or parameters are continually protected as new JRNSO bit sequences of sufficient size are produced. The operation used to protect the session key CK, using the available JRNSO bits is given as follows:

$$CK_n'(i) = CK_n(i) \oplus JRNSO(i); \quad \text{Equation (1)}$$

where $CK_n(i)$ is the i-th bit of $CK_n$, and $JRNSO(i)$ is the i-th bit of the current JRNSO sequence to produce $CK_n'(i)$, the i-th bit of the modified key $CK_n'$. The operator $\oplus$ represents bitwise exclusive OR (i.e., XOR). For instance $CK_1$, protected with the current JRNSO bits using equation 1 is represented as $CK_1'$. Likewise, the session keys IK and AK are protected as follows:

$$IK_n'(i) = IK_n(i) \oplus JRNSO(i); \quad \text{Equation (2)}$$

$$AK_n'(i) = AK_n(i) \oplus JRNSO(i); \quad \text{Equation (3)}$$

The protected keys $CK_n'$, $IK_n'$ and $AK_n'$ are used for confidentiality, integrity, and sequence number protection (step 445).

Ongoing JRNSO measurements continue (step 443), and when a current key life expires (step 446), and the WTRU 462 sends a new key request to the VLR 268 (step 447). The VLR 468 selects a new AV and sends a different CK, IK, RAND, (e.g., $CK_2$, $IK_2$ and $RAND_2$), to the RNC 466 (steps 448, 450). The RNC 466 sends the $RAND_2$ to the WTRU 462 (step 452). The WTRU 462 and the RNC 466 compute $CK'_2$, $IK'_2$ and $AK'_2$ according to Equations (1, 2 and 3) using the current set of JRNSO bits, respectively (steps 454, 456). Finally, at step 457, the new set of keys $CK'_2$, $IK'_2$ and $AK'_2$ are used for confidentiality, integrity and for sequence number protection.

(Note: it is assumed that the WTRU has successfully computed $CK_2$, $IK_2$, and $AK_2$ using the new RAND (i.e., $RAND_2$) before computing $CK'_2$, $IK'_2$ and $AK'_2$.)

The required block size of the JRNSO bit sequence is maintained through a bit management process. The JRNSO measurement process has a variable bit generation rate that may potentially be slow relative to the key life time. In other words, an entirely new set of JRNSO bits, (at least equal in length to the key or parameter size), may not have been generated during the current key life time. At a relatively slow generation rate, all new JRNSO bits may not be available to protect the next pair of session keys or parameters. To obtain a high level of computational and information-theoretic security, a fully fresh set of JRNSO bits are necessary to protect the next set of session keys and/or parameters.

In accordance with the present invention, a pseudorandom number generator (PNG) is utilized to generate the JRNSO bits. A PNG is a well-known method that involves converting a limited number of truly random bits, (i.e., limited number of newly acquired JRNSO bits acting as a seed), into a significantly larger, (e.g., exponentially larger), number of pseudorandom bits. The pseudorandom bits generated by the PNG retains the randomness properties of the original bits, (i.e., the inherent entropy is not reduced), and under standard computational assumptions, the problem of distinguishing the resulting bit sequence from a truly random bit sequence of the same length is computationally intractable.

Using the PNG, even a relatively small number of JRNSO bits can be expanded to a desired block size to protect keys and/or parameters when required. For example, even the initial integrity key $IK_1$, which is used to insure the integrity of the cipher mode command, can be protected in real time when only a limited number of JRNSO bits are initially available.

In accordance with another embodiment, a windowing technique is used. The windowing technique insures that the size of the JRNSO bits is always at least equal to the required size, (e.g., the length of CK and IK), once that length has been achieved strictly through the measurement process. The most recently acquired random bits derived from JRNSO measurements are pipelined with existing bits. Aging bits are discarded according to a first-in-first-out (FIFO) rule. The ramp-up time to the required length determines which session keys are the first to benefit from JRNSO protection. This method of JRNSO bit management is less desirable because of the obvious latency due to the initial ramping to the full window size that is inherent in its implementation, and because it affords far less security than that derived from using PNG.

In cases where the communication technology is conducive to high JRNSO bit rates, session keys CK and IK can be generated purely from the channel impulse response measurements, and the PNG or windowing technique may not be used.

In cases where it is desirable to update the same session keys multiple times (regularly and frequently), the PNG may provide the updates at the desired rate supplemented by re-seeding with JRNSO bits as and when they are available. Other more adaptive techniques that take advantage of changing channel conditions may also be employed, and previous session keys may be altered.

JRNSO measurements may be performed during handover. The handover may be hard handover or soft handover. For the case of hard handover, JRNSO measurement is simplified because only one channel between a WTRU and a Node B is operating at any given time. For the case of soft handover, a WTRU communicates with multiple Node Bs simultaneously, and JRNSO measurements using multiple channels occur simultaneously. During soft handover, JRNSO buffer management is potentially more complex since multiple buffers exist simultaneously for more than one Node B. Preferably, all bits derived from these simultaneous measurements are used for generating JRNSO bits.

Figure 5:
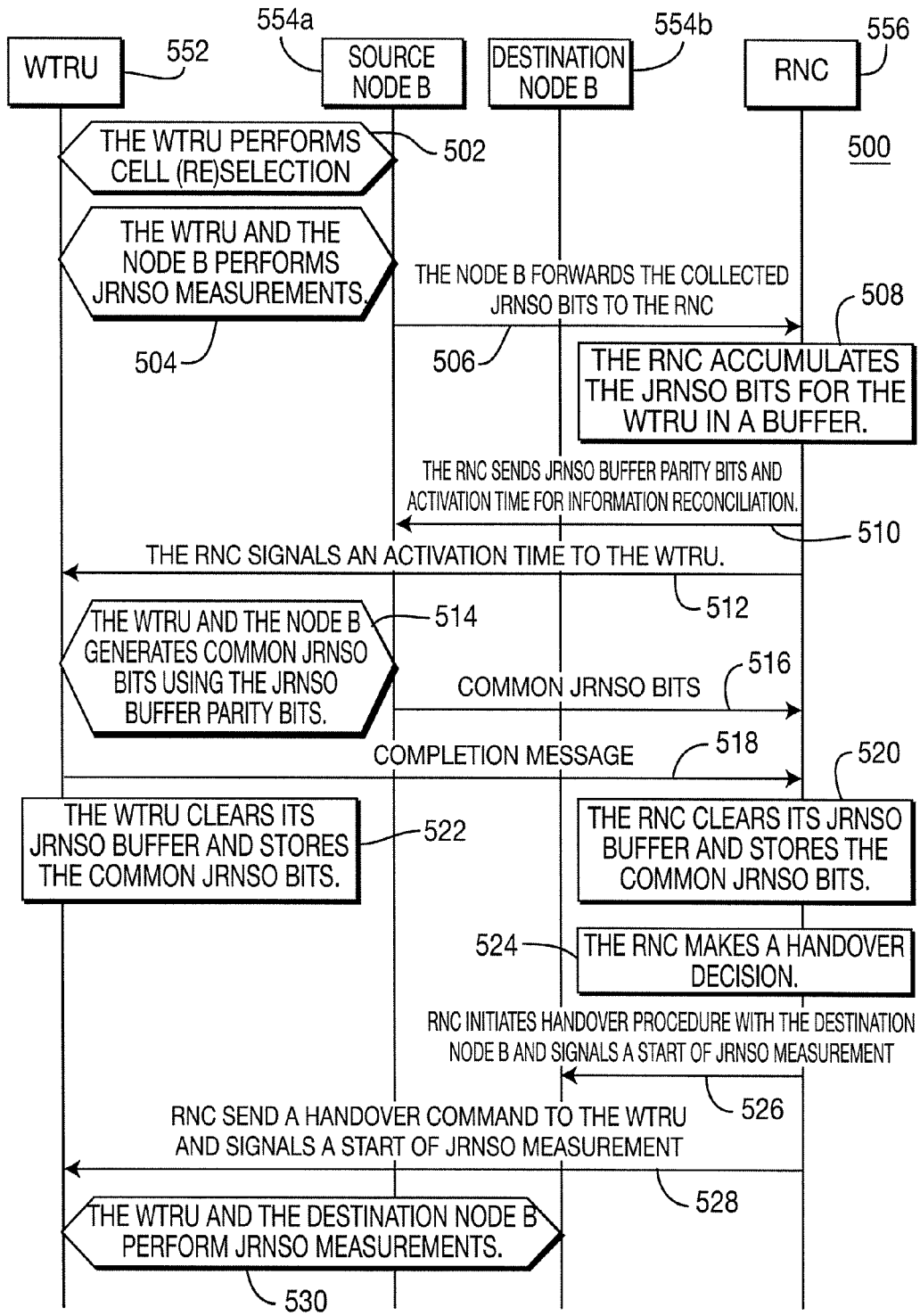
FIG. 5 is a signaling diagram of an exemplary process for protecting keys using JRNSO bits during handover in accordance with the present invention.

FIG. 5 is a signaling diagram of an exemplary process 500 for protecting keys using JRNSO bits during handover in accordance with the present invention. A WTRU 552 (re)selects a cell (step 502). A channel is established between the WTRU 552 and a source Node B 554a and the WTRU 552 and the source Node B 554a perform JRNSO measurements (step 504). The WTRU 552 may be in an Cell_DCH or Cell_PCH state. The JRNSO measurements are performed on an on-going basis. The source Node B 554a sends the JRNSO bits to an RNC 556 (step 506). The RNC 356 accumulates the JRNSO bits in a buffer (step 508). If the RNC 556 had previously reserved a buffer for the WTRU 552, the RNC 556 adds the recently received JRNSO bits to the existing buffer. If no such buffer exists a new empty buffer is created for the WTRU 552. The later condition may occur if this is an initial cell selection, or a cell reselection process takes the WTRU 552 to a new location area where any previously collected JRNSO bits would not be tagged.

When the RNC 556 determines that a sufficiently large amount of JRNSO bits are available, the RNC 556 sends JRNSO buffer parity bits to the source Node B 554a and activation time for information reconciliation (IR) between the source Node B 554a and the WTRU 552 (step 510). The IR is for removing discrepancies between the JRNSO bits stored in the WTRU 552 and the source Node B 554a. The IR is performed using parity bits, which has been disclosed in the copending U.S. patent application Ser. Nos. 11/339,958 and 11/318,381. The RNC 556 also signals the WTRU 552 an activation time to reconcile JRNSO bits with the source Node B 554a (step 512).

The WTRU 552 and the source Node B 554a performs IR to generate a common JRNSO bit sequence using the JRNSO buffer parity bits (step 514). The source Node B 554a sends the common JRNSO bits to the RNC 556 (step 516). The WTRU 552 also sends a completion message to the RNC 556 (step 518). The RNC 556 clears the JRNSO buffer and the common JRNSO bits are stored in the JRNSO buffer (step 520). The WTRU 552 also clears its JRNSO buffer and stores the common JRNSO bits in the JRNSO buffer (step 522).

When the WTRU 552 passes the boundary of the cells and enters the range covered by a destination Node B 554b, the RNC 556 makes a handover decision (step 524). The RNC 556 initiates a handover procedure with the destination Node B 554b and signals a start of JRNSO measurement (step 526). The RNC 556 sends a handover command to the WTRU 552 and signals a start of JRNSO measurement (step 528).

JRNSO measurements are resumed between the WTRU 552 and the destination Node B 554b and new JRNSO bits are generated (step 530). The continuation of the buffer is handled by tagging the JRNSO bits and including it as part of the handover messaging and transfer mechanism.

In accordance with another embodiment of the present invention, the handover (hard or soft handover) is intentionally initiated by the network to increase the rate of JRNSO bit generation by making a WTRU to communicate with multiple Node Bs either in a controlled sequence (in the case of hard handover) with different Node Bs, or in simultaneous multiple links with different Node Bs (in the case of soft handover). With this scheme, different sets of JRNSO bits are generated per different links a WTRU has with different Node Bs. The WTRU may pre-sort the different sets of JRNSO bits associated with different Node Bs, and may accumulate multiple sets of statistically independent JRNSO bits. Afterwards, the WTRU may generate a longer stream of JRNSO bits using the multiple sets of JRNSO bits.

Each of the Node Bs also generates JRNSO bits and reports the generated JRNSO bits to an accumulation controller. The accumulation controller may be either one of the Node Bs involved in the handover or an RNC. The accumulation controller collects and accumulates all the different sets of JRNSO bits generated by the Node Bs, synchronizes them, and uses them to generate a longer stream of JRNSO bits. For IR between the WTRU and each of the Node Bs, a separate set of parity bits is generated for each set of JRNSO bits during an information reconciliation process. If N channels are involved, N independent reconciliations are performed by the accumulation controller using all the parity bits it receives.

After the handover procedure is finished and enough JRNSO bits are accumulated, the accumulation controller controls the participating Node Bs to terminate the handover procedure and lets the WTRU to communicate normally with one Node B, (or with multiple Node Bs if the network decides the WTRU needs to be in handover for reasons other than increased JRNSO bit generation).

The WTRU and the Node B may be equipped with multiple antennas such that multiple-input multiple-output (MIMO) or beam-forming may be implemented. A higher rate of JRNSO bit generation is possible by adaptively changing antenna configurations for transmission and reception.

Figure 6:
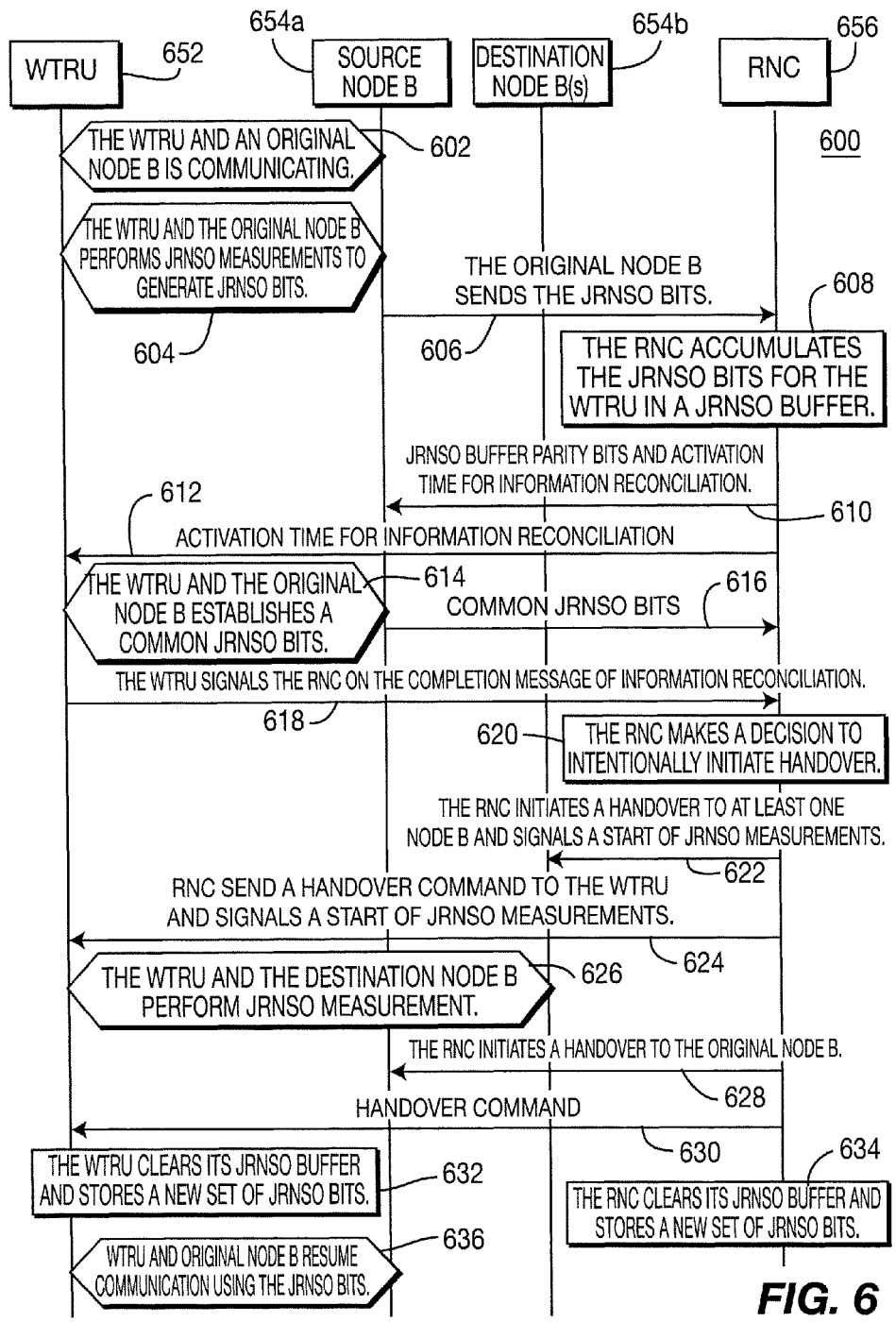
FIG. 6 is a signaling diagram of an intentionally induced hard handover process in accordance with the present invention.

FIG. 6 is a signaling diagram of an intentionally induced hard handover process 600 in accordance with the present invention. A WTRU 652 and a source Node B 654a is communicating (step 602). The WTRU 652 and the source Node B 654a perform JRNSO measurements to generate JRNSO bits (step 604). The WTRU 652 may be in a Cell_FACH or Cell_DCH state. The source Node B 654a sends the JRNSO bits to the RNC 656 (step 606). The RNC 656 accumulates the JRNSO bits for the WTRU 652 in a JRNSO buffer (step 608). The RNC 656 sends JRNSO buffer parity bits to the source Node B 654a and indicates an activation time for IR (step 610). The RNC 656 also signals the WTRU 652 the activation time to reconcile JRNSO bits with the source Node B 654a (step 612).

The WTRU 652 and the source Node B 654a establishes a common JRNSO bits (step 614). The source Node B 654a sends the new JRNSO bits to the RNC 656 (step 616). The WTRU 652 also signals completion of the IR to the RNC 656 (step 618).

The RNC 656 makes a decision to intentionally handover to a destination Node B 654b (step 620). The RNC 656 initiates a handover to at least one destination Node B 654b and signals a start of JRNSO measurement (step 622). The RNC 656 sends a handover command to the WTRU 652 and signals a start of JRNSO measurement (step 624). JRNSO measurement is performed by the WTRU 652 and the at least one destination Node B 654b (step 626). The steps 604-624 may be repeated until the RNC 656, (i.e., the accumulation controller), determines that sufficient number of JRNSO bits have been accumulated. At that time, the RNC 656 terminates the intentionally induced handover and resumes normal communication, possibly using encryption using the previously accumulated JRNSO bits.

The RNC 656 may initiate a handover to the source Node B 654a (or to any other Node B) (step 628). The RNC 656 sends a handover command to the WTRU 652 and signals a start of JRNSO measurements (step 630). The WTRU 652 clears its JRNSO buffer and stores a new set of JRNSO bits (step 632). The RNC 656 also clears its JRNSO buffer and stores a new set of JRNSO bits (step 634). The WTRU 652 and the source Node B 654*a* resume communication using the JRNSO bits (step 636).

Alternatively, an RNC, (i.e., an accumulation controller), may intentionally induce soft handover to increase JRNSO bit generation rate. The RNC determines which Node Bs will participate in an intentionally induced soft handover with the WTRU to generate increased number of JRNSO bits. The RNC instructs the selected Node Bs to participate in the soft handover. This message is also sent to the WTRU in a call set-up message.

Each of the participating Node Bs transmits the same known signal, (called a downlink probe signal hereinafter), to the WTRU using slightly different offsets in transmit timing. The WTRU performs JRNSO measurements with the downlink probe signals from the multiple Node Bs. The WTRU may use a RAKE receiver for this purpose. The WTRU generates multiple sets of JRNSO bits from the downlink probe signals CIRs, and then accumulates the JRNSO bits to form a longer set of JRNSO bits in its buffer. Such accumulation continues until the WTRU is instructed to stop to do so by the network.

The WTRU transmits a known uplink signal to the Node Bs participating in the soft handover. Each of the Node Bs receives the uplink signal and performs JRNSO measurements to generate JRNSO bits. Each of the Node Bs sends its own JRNSO bits to an accumulation controller, (e.g., the RNC, a Node B, or an enhanced Node B (eNode B)). The accumulation controller then aggregates the JRNSO bits and generates a larger set of JRNSO bits. The accumulation controller, the Node Bs and the WTRU then execute an IR procedure to generate a common JRNSO bits.

After determining that a sufficient number of JRNSO bits have been generated, the accumulation controller instructs the participating Node Bs to terminate the soft handover. Preferably, a single best Node B is then selected to resume normal communication. The contents of the subsequent normal communication may be encrypted using the generated JRNSO bits.

For the JRNSO measurement in the downlink, any known signal or part of a known signal may be used for channel estimation. In the case of wideband code division multiple access (WCDMA) frequency division duplex (FDD), a common pilot channel (CPICH) may be used for the JRNSO measurement. In the uplink, a pilot part of an uplink dedicated physical channel (DPCH) may be used for the same purpose.

A WTRU and a Node B may have multiple antennas for implementing a MIMO and/or beamforming. In such case, the intentional handover has to be synchronized with proper switching, configuration, or beam-forming of the antenna elements on the WTRU. For example, in a soft handover situation, the WTRU may have to switch its antenna to an omni mode so that the WTRU may communicate with many Node Bs simultaneously. In a hard handover situation, a beam-forming direction has to be optimized in a sequence which is synchronized with the sequence of each of the Node Bs that participates in the hard handover Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. In a wireless communication system including a wireless transmit/receive unit (WTRU) and a serving network (SN), wherein the SN comprises at least a Node B and a radio network controller (RNC), a method for providing secure wireless communications, the method comprising:

the WTRU and the Node B performing joint randomness not shared by others (JRNSO) measurements to generate JRNSO bits based on a channel impulse response (CIR) estimate between the WTRU and the Node B;

the WTRU and the Node B performing a reconciliation procedure to generate common JRNSO bits;

the Node B sending the common JRNSO bits to the RNC;

the WTRU and the SN generating a session key used for security;

the WTRU and the SN securing said session key using the common JRNSO bits when a length of said common JRNSO bits are compared to a length of said session key and are greater than or equal to said length of said session key;

the SN sending a handover command to the WTRU and a second Node B to initiate a handover to the second Node B, the SN informing a start of JRNSO measurements between the WTRU and the second Node B;

the WTRU and the second Node B performing JRNSO measurement to generate a first set of JRNSO bits based on a channel estimate between the WTRU and the second Node B;

the WTRU and the second Node B performing a reconciliation procedure to generate a second set of common JRNSO bits;

the second Node B sending the second set of common JRNSO bits to the SN; and the WTRU and the SN securing the session key used for security using the second set of common JRNSO bits.

2. In a wireless communication system including a wireless transmit/receive unit (WTRU) and a serving network (SN), wherein the SN comprises at least a Node B and a radio network controller (RNC), a method for providing secure wireless communications, the method comprising:

the WTRU and the Node B performing joint randomness not shared by others (JRNSO) measurements to generate JRNSO bits based on a channel impulse response (CIR) estimate between the WTRU and the Node B;

the WTRU and the Node B performing a reconciliation procedure to generate common JRNSO bits;

the Node B sending the common JRNSO bits to the RNC;

the WTRU and the SN securing a session key used for security using the common JRNSO bits; and the SN initiating a handover to at least one alternative Node B to generate JRNSO bits between the WTRU and said at least one alternative Node B to increase a rate of JRNSO bits generation.

3. The method of claim 2 wherein the handover is a hard handover.

4. The method of claim 2 wherein the handover is a soft handover.

5. The method of claim 4 wherein each of the Node Bs transmits a same downlink probe signal to the WTRU.

6. The method of claim 5 wherein said each of the Node Bs sends the downlink probe signal with different time offsets.

7. The method of claim 5 wherein the WTRU uses a RAKE receiver in receiving the downlink probe signal.

8. The method of claim 2 further comprising:

the WTRU generating multiple sets of JRNSO bits associated with different Node Bs;

an accumulation controller collecting the multiple sets of JRNSO bits from the Node Bs; and the WTRU and the accumulation controller generating a longer stream of JRNSO bits using the multiple sets of JRNSO bits.

9. The method of claim 8 wherein the WTRU and the accumulation controller accumulate each of the multiple sets of JRNSO bits until the WTRU is instructed to stop to accumulate by the accumulation controller.

10. The method of claim 8 wherein the WTRU and the Node Bs use multiple antennas in generation of the JRNSO bits.

11. The method of claim 8 wherein the WTRU and the Node Bs use multiple-input multiple-output (MIMO) in generation of the JRNSO bits.

12. The method of claim 10 wherein the WTRU and the Node Bs use beam-forming in generation of the JRNSO bits.

13. The method of claim 10 wherein the WTRU and the Node Bs adaptively change antenna configurations for transmission and reception in generation of the JRNSO bits.

14. The method of claim 8 wherein the accumulation controller is one of the Node Bs involved in the handover.

15. The method of claim 8 wherein the accumulation controller is said RNC.

16. A wireless communication system configured to secure wireless communications, the system comprising:

a wireless transmit/receive unit (WTRU) configured to perform joint randomness not shared by others (JRNSO) measurement to generate JRNSO bits based on a channel estimate between the WTRU and a Node B and perform a reconciliation procedure to generate common JRNSO bits; and a serving network (SN) including at least the Node B and a radio network controller (RNC), the Node B configured to perform JRNSO measurement to generate JRNSO bits based on a channel estimate between the WTRU and the Node B and perform a reconciliation procedure to generate the common JRNSO bits, the SN and said WTRU configured to generate a session key used for security and secure said session key using the common JRNSO bits when a length of the common JRNSO bits are compared to a length of said session key and are greater than or equal to said length of said session key, wherein the SN is configured to send a handover command to the WTRU and a second Node B to initiate a handover to the second Node B, and inform a start of JRNSO measurements between the WTRU and the second Node B and the WTRU and the second Node B are configured to perform JRNSO measurement to generate JRNSO bits based on a channel estimate between the WTRU and the second Node B, and perform a reconciliation procedure to generate second common JRNSO bits so that at least one of a session key and a parameter used for security is secured using the second common JRNSO bits.

17. A wireless communication system configured to secure wireless communications, the system comprising:

a wireless transmit/receive unit (WTRU) configured to perform joint randomness not shared by others (JRNSO) measurement to generate JRNSO bits based on a channel estimate between the WTRU and a Node B and perform a reconciliation procedure to generate common JRNSO bits; and a serving network (SN) including the Node B, the Node B configured to perform JRNSO measurement to generate JRNSO bits based on a channel estimate between the WTRU and the Node B and perform a reconciliation procedure to generate the common JRNSO bits, the SN configured to secure a session key used for security using the common JRNSO bits, wherein the SN is configured to initiate a handover to at least one destination Node B to generate JRNSO bits between the WTRU and said at least one destination Node B to increase a rate of JRNSO bits generation.

18. The system of claim 17 wherein the handover is a hard handover.

19. The system of claim 17 wherein the handover is a soft handover.

20. The system of claim 19 wherein each of the Node Bs transmits a same downlink probe signal to the WTRU.

21. The system of claim 20 wherein each of the Node Bs sends the downlink probe signal with different time offsets.

22. The system of claim 20 wherein the WTRU uses a RAKE receiver in receiving the downlink probe signal.

23. The system of claim 17 further comprising:

an accumulation controller configured to collect multiple sets of JRNSO bits from the Node Bs and generate a longer stream of JRNSO bits using the multiple sets of JRNSO bits, wherein the WTRU is configured to generate multiple sets of JRNSO bits associated with different Node Bs and generate a longer stream of JRNSO bits using the multiple sets of JRNSO bits.

24. The system of claim 23 wherein the WTRU and the accumulation controller accumulate each of the multiple sets of JRNSO bits until the WTRU is instructed to stop to accumulate by the accumulation controller.

25. The system of claim 24 wherein the WTRU and the Node Bs use multiple antennas in generation of the JRNSO bits.

26. The system of claim 25 wherein the WTRU and the Node Bs use multiple-input multiple-output (MIMO) in generation of the JRNSO bits.

27. The system of claim 25 wherein the WTRU and the Node Bs use beam-forming in generation of the JRNSO bits.

28. The system of claim 25 wherein the WTRU and the Node Bs adaptively change antenna configurations for transmission and reception in generation of the JRNSO bits.

29. The system of claim 23 wherein the accumulation controller is one of the Node Bs involved in the handover.

30. The system of claim 23 wherein the accumulation controller is said RNC.

* * * * *